(12) United States Patent
Ito et al.

(10) Patent No.: US 7,024,307 B2
(45) Date of Patent: Apr. 4, 2006

(54) MAP EVALUATION SYSTEM, COLLATION DEVICE, AND MAP EVALUATION DEVICE

(75) Inventors: Toshiyuki Ito, Toyohashi (JP); Katsuhiko Mutoh, Obu (JP); Kohji Katoh, Obu (JP); Hideki Tanino, Kariya (JP)

(73) Assignee: Denso Corporation, Kariya (JP)

( * ) Notice: Subject to any disclaimer, the term of this patent is extended or adjusted under 35 U.S.C. 154(b) by 19 days.

(21) Appl. No.: 10/729,936

(22) Filed: Dec. 9, 2003

(65) Prior Publication Data
US 2004/0122590 A1 Jun. 24, 2004

(30) Foreign Application Priority Data
Dec. 20, 2002 (JP) .............................. 2002-370663

(51) Int. Cl.
*G01C 21/30* (2006.01)
(52) U.S. Cl. .................................................... 701/208
(58) Field of Classification Search ................ 701/208, 701/210, 207, 200; 702/5; 342/357.09, 342/357.13
See application file for complete search history.

(56) References Cited

U.S. PATENT DOCUMENTS

| | | | | |
|---|---|---|---|---|
| 5,948,042 A | * | 9/1999 | Heimann et al. | 701/208 |
| 6,047,234 A | * | 4/2000 | Cherveny et al. | 701/200 |
| 6,230,098 B1 | * | 5/2001 | Ando et al. | 701/208 |
| 6,453,233 B1 | * | 9/2002 | Kato | 701/208 |
| 6,662,105 B1 | * | 12/2003 | Tada et al. | 701/209 |
| 6,718,258 B1 | * | 4/2004 | Barton | 701/200 |
| 6,728,633 B1 | * | 4/2004 | Mikuriya et al. | 701/208 |
| 2002/0004701 A1 | * | 1/2002 | Nakano | 701/200 |
| 2002/0077745 A1 | | 6/2002 | Ohmura et al. | |
| 2002/0128768 A1 | * | 9/2002 | Nakano et al. | 701/202 |

FOREIGN PATENT DOCUMENTS

JP  2003-207342  *  7/2003

* cited by examiner

*Primary Examiner*—Michael J. Zanelli
(74) *Attorney, Agent, or Firm*—Posz Law Group, PLC

(57) ABSTRACT

A map evaluation system is equipped with a car navigation device and a map evaluation device. The car navigation system generates difference data indicating a location where a difference is present between a vehicle position path and a road location obtained from a map database. The car navigation device then sends the difference data along with additional data relating to accuracy of the difference data. The map evaluation device determines accuracy for the difference data based on the additional data. When the accuracy degree of the difference data is determined to be proper, the map evaluation device increments by one a determining count of a group including the difference data. When the determining count exceeds a given count, a portion to be amended on the map database is displayed on a monitor based on the difference data stored in a difference database.

21 Claims, 5 Drawing Sheets

MAP EVALUATION SYSTEM, COLLATION DEVICE, AND MAP EVALUATION DEVICE

CROSS REFERENCE TO RELATED APPLICATIONS

This application is based on and incorporates herein by reference Japanese Patent Application No. 2002-370663 filed on Dec. 20, 2002.

FIELD OF THE INVENTION

The present invention relates to a map evaluation system that evaluates and outputs a degree of credibility of a road map stored in a map database. The present invention furthermore relates to a collation device and map evaluation device used in the map evaluation system.

BACKGROUND OF THE INVENTION

A map display device is known. It reads out a road map from a map database and displays the read road map on a displaying unit such as a liquid crystal display. For instance, a car navigation device is known as the map display device.

The car navigation system is equipped with a vehicle position detection device that detects a vehicle current position based on information obtained from a GPS receiver, a speed sensor, or the like. Position information obtained from the vehicle position detection device is displayed on the displaying unit with being overlapped on a road map. The car navigation device furthermore retrieves a route from the current position till a destination according to destination information obtained through user's manipulation. Routing assistance is thereby executed via voice or the like.

The road map used for retrieving the route preferably needs an actual road configuration to be reflected on it. When the road map used for retrieving the route is different from the actual road configuration, the car navigation mistakenly executes routing assistance. The user thereby advances to a wrong direction.

US Patent Application of US 2002/0077745 A1 discloses a system avoiding the above. Here, a map database is provided at an information center and seriatim updated by a person of the information center. The latest road map stored in the map database is thereby distributed to car navigations via wireless communications.

However, in the above case, the person at the information center cannot determine whether contents of the database are correct or not. Even when an actual road configuration is changed, the contents of the database cannot be immediately updated.

SUMMARY OF THE INVENTION

It is an object of the present invention to provide a map evaluation system that quickly supplies a society with a highly reliable road map where actual road configuration is correctly included.

To achieve the above object, a map evaluation system is provided with the following. A road location is collated with a vehicle position path. It is determined whether a difference is present between the vehicle position path and the road location. Difference information indicating a location having the difference is generated when the difference is determined to be present. Here, the vehicle position path is detected by a vehicle position detecting unit, while the road location is indicated on a road map stored by a map database and corresponds to the vehicle position path. Accuracy information is obtained for determining degree of accuracy for the difference information. Determination of the degree of accuracy for the difference information is executed based on the accuracy information. Degree of credibility for a portion of the road map is evaluated based on a result of determination of the degree of accuracy. Here, the portion of the road map corresponds to the location indicated by the difference information. A result of evaluation of the degree of credibility is outputted.

In the above structure, the difference information is generated based on the vehicle position path. Degree of accuracy for the difference information is then determined. By considering a result of the determination of the degree of accuracy, the degree of credibility for the road map is evaluated. This results in enabling the degree of credibility for the road map to be properly evaluated. A highly reliable evaluation result can be thereby outputted to users of the system. Location where a road is assumed to be newly constructed or modified is notified to the users through outputting. The users can thereby determine whether updating the road map is necessary. Accordingly, using of the map evaluation system of the present invention enables quickly supplying a society with a highly reliable road map where actual road configuration is correctly included. Furthermore, based on the evaluation result, the corresponding location can be actually investigated. The road map can be thereby updated based on the investigation result.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
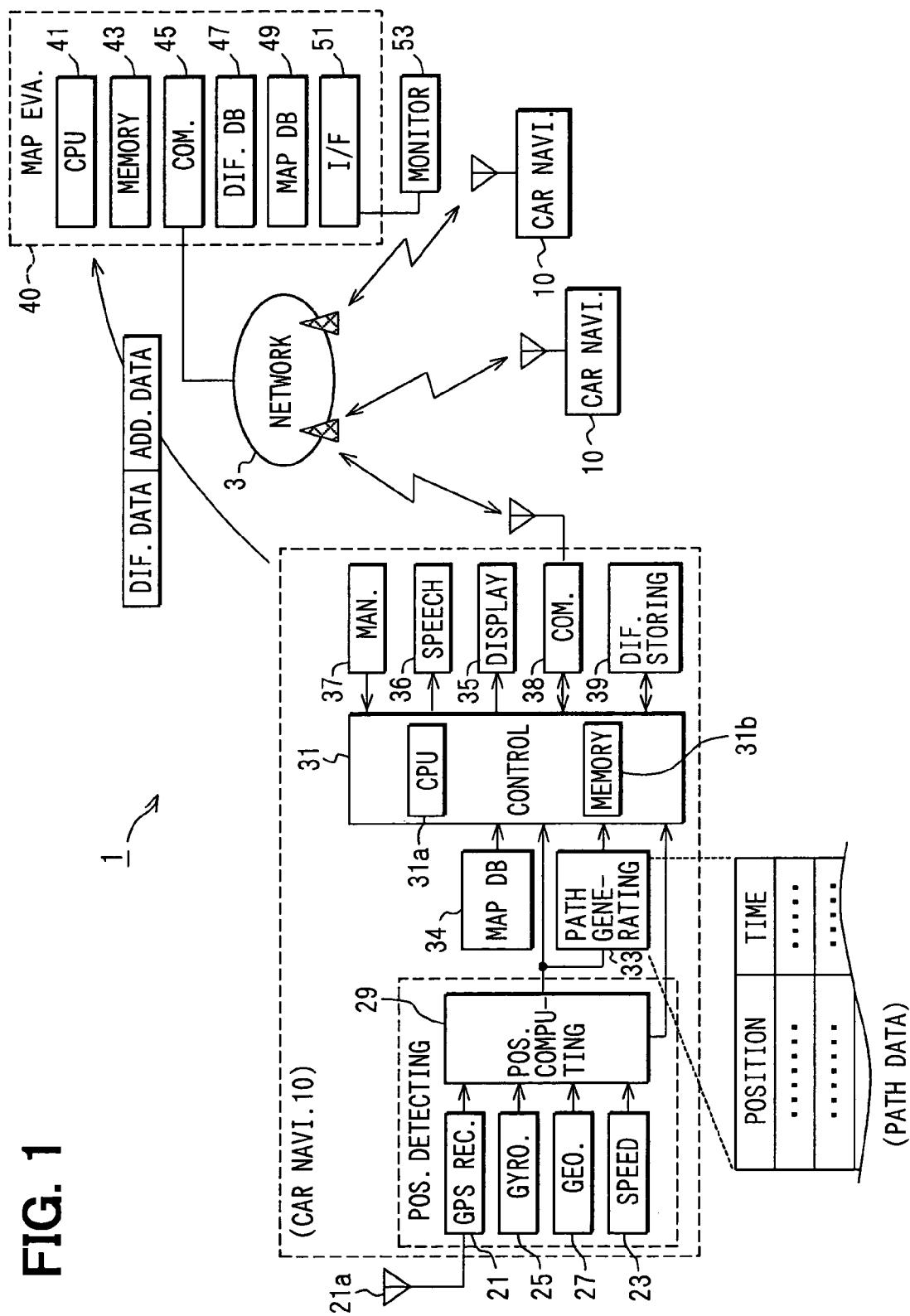
FIG. 1 is a diagram showing a schematic overall structure of a map evaluation system according to an embodiment of the present invention.

A map evaluation system 1, to which the present invention is directed, is equipped with a car navigation device 10, being as a collation device, and a map evaluation device 40, as shown in FIG. 1. The car navigation device 10 and the map evaluation device 40 are communicated with each other through a wide area network such as the Internet.

The car navigation device 10 is equipped with a position detecting unit 20, a path generating unit 33, a map database (DB) 34, a displaying unit 35, a speech outputting unit 36, a manipulating unit 37, a communicating unit 38, and a difference storing unit 39. The position detecting unit 20 includes a GPS receiver 21, a speed sensor 23, a gyroscope 25, and a geomagnetic sensor 27. The GPS receiver 21 receives satellite radio waves sent from GPS satellites via an antenna 21a to measure a current position of a vehicle where the car navigation device 10 is mounted. The speed sensor 23 detects a traveling speed of the vehicle. The gyroscope 25 detects a magnitude of rotation motion that acts on the vehicle. The geomagnetic sensor 27 detects an absolute orientation based on geomagnetism. The position detecting unit 20 computes the most correct vehicle current position using a position computing unit 29 based on information from the sensors 21, 23, 25, 27 that have the respective errors.

The position detecting unit 20 inputs, into a controlling unit 31 and the path generating unit 33, current position information indicating the vehicle current position computed by the position computing unit 29. The path generating unit 33 stores all the current position information in a built-in memory (not shown) and thereby generates path data indicating a vehicle traveling path (or vehicle position path). In detail, the path generating unit 33 generates the path data by seriatim writing in the memory the current position information and time information corresponding to the current position information with correlating them with each other.

The map database 34 includes built-in memory storage and a reading unit. The memory storage stores various data necessary for drawing a map such as map data. The reading unit is controlled, by the controlling unit 31, for reading out information from the above memory storage and inputting the preceding information into the controlling unit 31. The memory storage can be a hard disk that is fixed in the reading unit or CD-ROM, DVD, or the like that is detachable out of the reading unit.

The memory storage stores: road data as a road map including information relating to connection of roads such as road locations; data of buildings and geography used for displaying on the displaying unit 35 the buildings, parks, rivers, or the like; data for map matching used for locating a road where the vehicle is traveling; and the like. Here, the road location is a typically linear area where a road is present.

The speech outputting unit 36 is used for notifying via speech various necessary assistance to a user. The speech outputting unit 36 includes a speech processing circuit (not shown) and a speaker. The manipulating unit 37 is used for obtaining information manipulated by a user. The manipulating unit 37 is formed of a touch panel switch set on the screen of the displaying unit 35 combined with the manipulating unit 37, or formed of a mechanical switch provided around the displaying unit 35 of the car navigation device 10.

The controlling unit 31 includes a CPU 31a and a memory 31b (ROM, RAM, or the like) to control each part of the car navigation device 10. The memory 31b stores a program for realizing a navigation function such as a route search or routing assistance, and other programs, for instance, for processing that will be explained later.

The above-mentioned controlling unit 31 reads out road data around the vehicle current position from the map database 34 based on the current position information obtained from the position detecting unit 20. It furthermore displays the map of a region around the current position on the displaying unit 35 along with a mark showing the vehicle current position, the mark which is overlapped on the map.

Furthermore, when a command requiring designating a route to a destination is inputted through the manipulating unit 37 by user's manipulation, the controlling unit 31 retrieves and designates the most proper route from the vehicle current position to the destination. For guiding the user with following the route, the controlling unit 31 controls the displaying unit 35 for displaying a guided route with using a known method. Simultaneously, the controlling unit 31 controls the speech outputting unit 36 for guiding the user by speech so that the user can drive the vehicle along the guided route.

Figure 2:
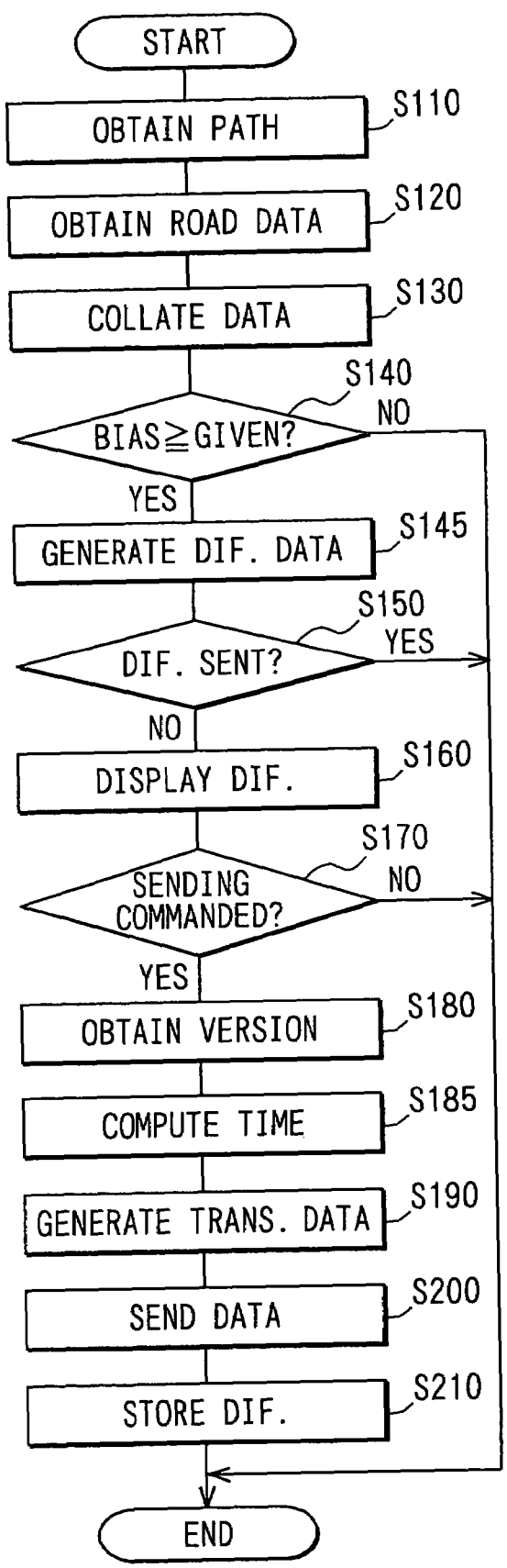
FIG. 2 is a flowchart diagram explaining map collating processing of a car navigation device.

Furthermore, the controlling unit 31 determines whether a difference is present between a vehicle position path that is shown in the path data and a road location shown in the road data by executing map collating processing shown in FIG. 2. When the difference is determined to be present, difference data is generated as difference information indicating a location where the difference is present. The generated difference data is sent to the map evaluation device 40 through the communicating unit 38 via wireless communications.

In detail, referring to FIG. 2, at Step 110, the controlling unit 31 obtains the latest path data from the path generating unit 33. As explained above, the path generating unit 33 stores the current position information with the time information correlated with the current position information. For instance, the controlling unit 33 obtains as the latest path information the current position information and time information which are not included in the previous processing.

After obtaining the path data, the controlling unit 31 obtains from the map database 34 road data of a location corresponding to the path data at Step 120. The controlling unit 31 then collates the road data with the path data at Step 130. At Step 140, whether the path is present in a location where no road is present in the road data is determined by determining whether the path data is biased by a given value or more from the road location indicated by the road data. When the vehicle position is determined to be not biased by the given value or more (No at Step 140), the map collating processing is terminated.

Figure 3:
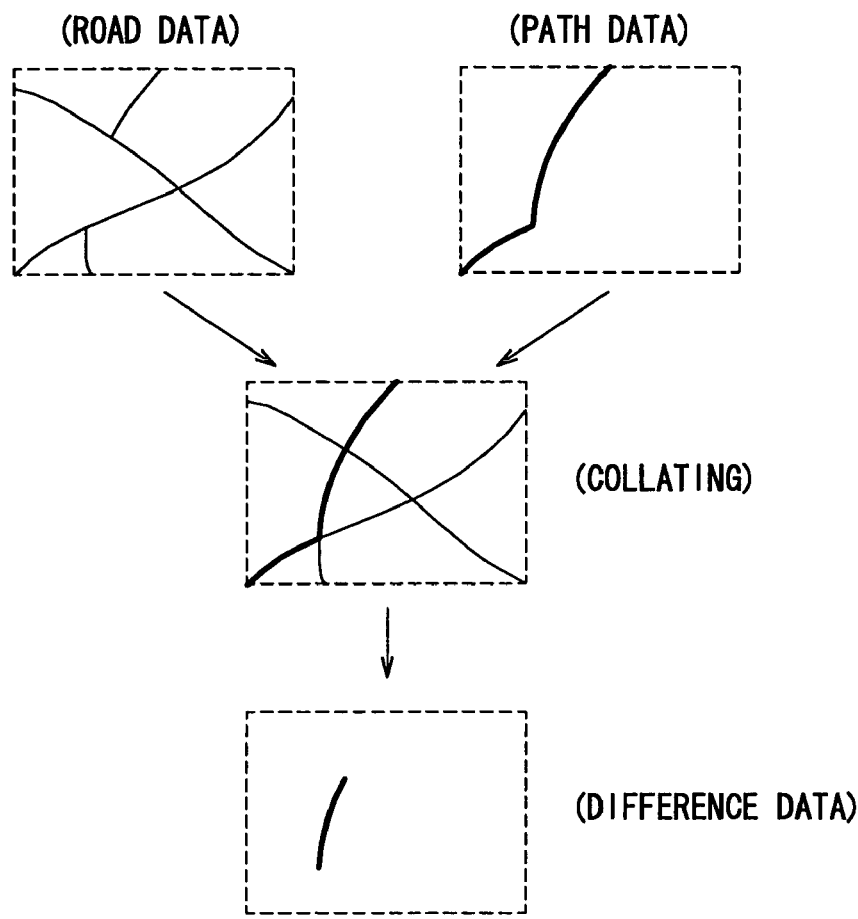
FIG. 3 is a diagram showing difference data generating.

By contrast, when the vehicle position is determined to be biased by the given value or more (Yes at Step 140), the controlling unit 31 determines that the path is present in the location where no road is present in the road data. The controlling unit 31 then generates difference data indicating a location where the difference is present at Step 145. Here, as shown in FIG. 3, the difference data can be path information of the location where no road is present on the road data.

At Step 150, the controlling unit 31 determines based on contents of the difference data stored in the difference data storing unit 39 whether the same difference data as this-time generated difference data was previously sent to the map evaluation device 40. Here, at Steps 200 and 210 that will be explained later, the generated difference data is sent to the map evaluation device 40 and stored in the difference storing unit 39. Accordingly, at Step 150, the controlling unit 31 determines whether the this-time newly found location corresponds to the stored difference data in the difference storing unit 39 and whether the difference data of the same location was previously sent.

When the difference data of the same location is determined to be previously sent (Yes at Step 150), the controlling unit 31 terminated the map collating processing. Otherwise, when the difference data of the same location is determined to be not previously sent (No at Step 150), the controlling unit 31 controls the displaying unit 35 for displaying a message indicating that a difference is present between the vehicle path and the road map.

The controlling unit 31 thereafter determines whether through the manipulating unit 37a command requiring sending of the difference data is inputted within a given period at Step 170. When the command is determined to be not inputted (No at Step 170), the processing is terminated. By contrast, when the command is determined to be inputted (Yes at Step 170), the controlling unit 31 obtains version information of the built-in map database 34 from the map database 34 and position accuracy information relating to position detecting accuracy of the position detecting unit 20 at Step 180. Here, the position computing unit 29 computes attainable degree of accuracy for current position by using error information obtained from the sensors 21, 23, 25, 27 to input the computed attainable degree of accuracy into the controlling unit 31.

Figure 4:
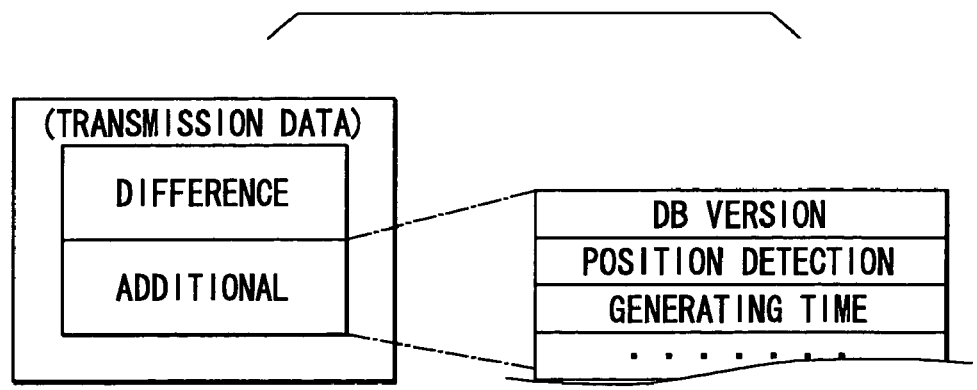
FIG. 4 is a diagram showing structure of transmission data.

At Step 185, the controlling unit 31 computes generating time for the path data being a target for this-time collating based on time information stored in the path generating unit 33. At Step 190, the controlling unit 31 generates transmission data. The transmission data includes the difference data and additional data. The additional data furthermore includes the version information and position accuracy information obtained at Step 180 and generating time information relating to the generating time computed at Step 185. Structure of the transmission data is shown in FIG. 4.

At Step 200, the controlling unit 31 sends into the map evaluation device 40 the transmission data. At Step 210, the difference data that is sent this time is stored in the difference storing unit 39, and the processing is then terminated.

In the next place, the map evaluation device 40 is, as shown in FIG. 1, equipped with the following: a CPU 41 for controlling the device 40; a memory 43 for storing an executable program for the CPU 41; a communicating unit 45; a difference database 47 for storing the difference data or the like; a map database 49 for storing road data or the like; an interfacing unit 51 for interfacing with a monitor 53; and the like. The communicating unit 45 can bi-directionally communicate with the car navigation via the wide area network.

The map evaluation device 40 repeatedly executes, using the CPU 41, a main routine shown in FIG. 5, which will be explained below. At Step 310, the CPU 41 determines whether the difference data and additional data are received after the main routine is started. When they are determined to be received (Yes at Step 310), the difference data and additional data are obtained from the communicating unit 45 and then accuracy determining processing is executed at Step 320 that is explained in FIG. 6A.

As the accuracy determining processing is started, the CPU 41 extracts the version information of the map database 34 provided in the car navigation device 10, the generating time information, and the position accuracy information at Step 321. The CPU 41 obtains version information of the database 49 provided in the own device 40 from the map database 49 at Step 322.

At Step 323, the CPU 41 determines whether the version of the map database 34 provided in the car navigation 10 is the latest by comparing with the version of the map database 49 provided in the own device 40. Here, it is provided that the map evaluation device 40 has the latest version of the map database 49.

When the version of the car navigation device 10 is determined to be not the latest (No at Step 323), the CPU 41 terminates the accuracy determining processing. Otherwise, when the version of the car navigation device 10 is determined to be the latest (Yes at Step 323), it is determined whether the generating time is a given time or less at Step 324.

When the generating time is then determined to be more than the given time (No at Step 324), the processing is terminated. When the generating time is determined to be the given time or less (Yes at Step 324), the CPU 41 determines whether the position detecting unit 20 built in the car navigation 10 has a given degree of accuracy or more at Step 325.

When the position detecting unit 20 is determined to have less than the given degree of accuracy (No at Step 325), the processing is terminated. When the position detecting unit 20 is determined to have the given degree of accuracy or more (Yes at Step 325), the CPU 41 determines that the accuracy degree of the difference data reaches a proper accuracy degree. As a result of the determination, a command requiring updating the road map using the difference data is thereby outputted at Step 326 to then terminate the processing.

When the additional information included in the difference data has a high accuracy degree, the accuracy degree of the difference data is assumed to have a high accuracy degree for evaluating credibility degree of the map. Therefore, the command of updating the difference database 47 can be outputted only when all the above conditions are effected. For confirmation, the above three conditions are as follows: the version of the map database 34 is the latest version; the generating time for the path data is the given time or less; and the accuracy degree of the position detection is the given degree or more.

Figure 5:
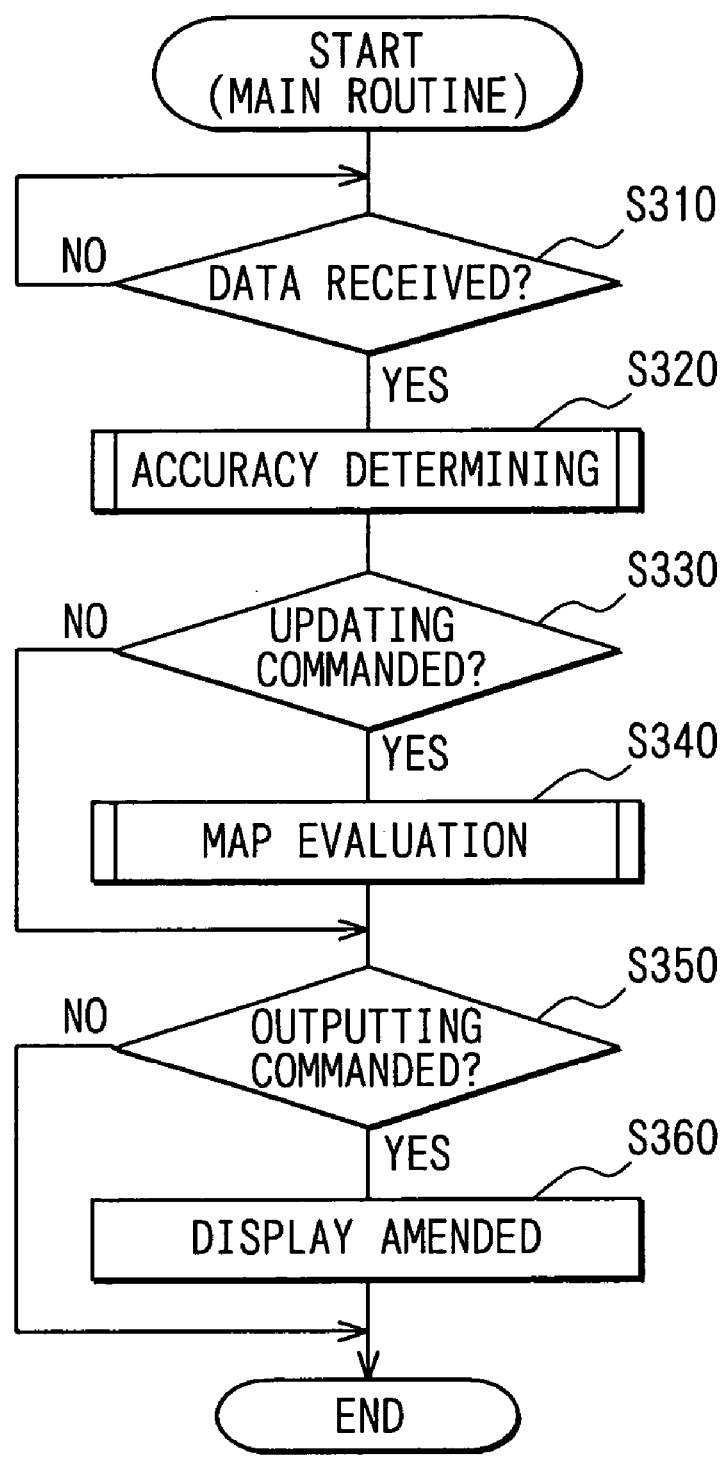
FIG. 5 is a flowchart diagram explaining a main routine of a map evaluation device.
Figure 6A:
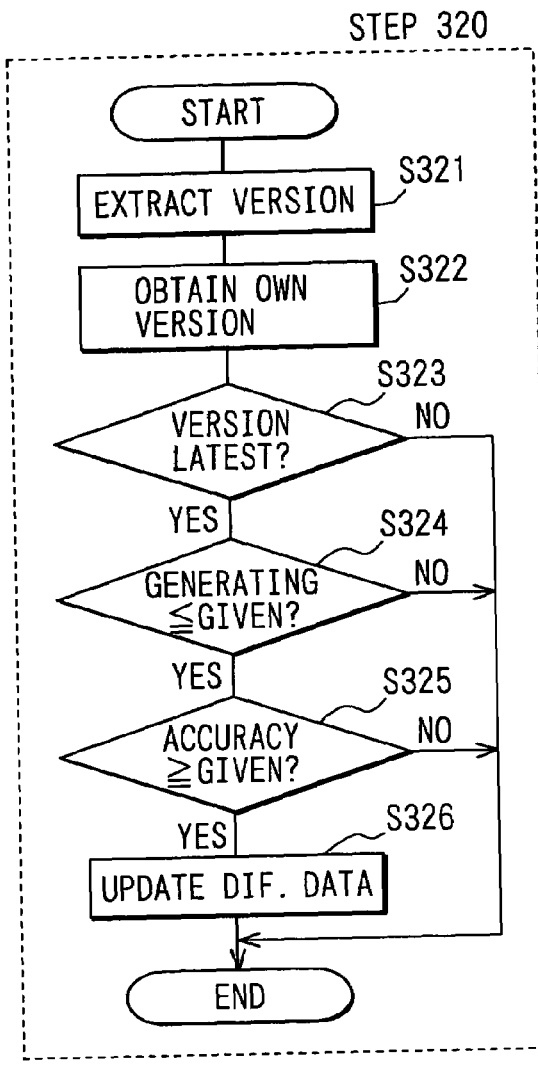
FIG. 6A is a flowchart diagram explaining accuracy determining processing of a map evaluation device.
Figure 6B:
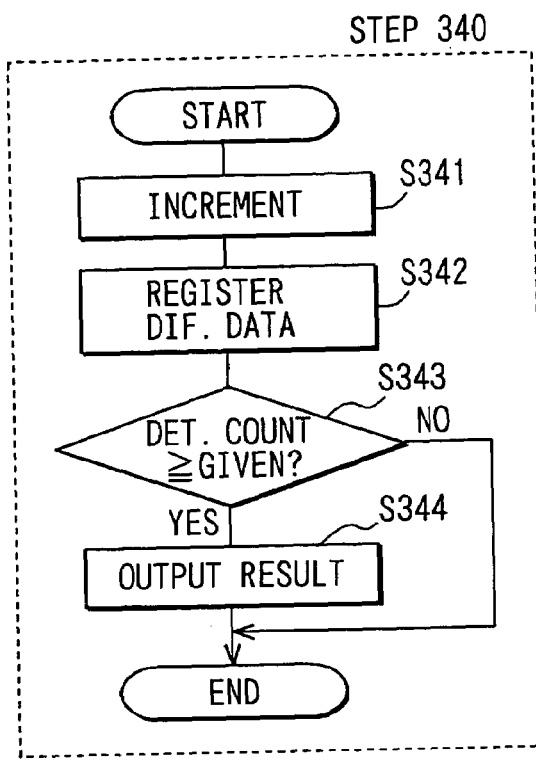
FIG. 6B is a flowchart diagram explaining map evaluating processing of a map evaluation device.

The CPU 41 thereafter determines whether the command of updating the difference database 47 is outputted at Step 330 shown in FIG. 5. When the command is determined to be not outputted, the main routine is terminated. Otherwise, when the command is determined to be outputted (Yes at Step 330), map evaluating processing shown in FIG. 6B is executed at Step 340.

As the map evaluating processing is started, at Step 341 the CPU 41 increments by one a determining count of a group corresponding to the difference data that is received from the car navigation device 10. Here, the determining count indicates a value of times of determination that the accuracy degree of the difference data reaches the proper degree, or a value of times of the command of updating. The value indicates credibility degree of the road data. When the value is small, the credibility degree of the road data is high (or the present road data probably indicates an actual road configuration in reality).

In this embodiment, each time the command of updating the difference database 47 is outputted, the determining count corresponding to the location indicated by the difference data is incremented. Each time the accuracy degree of the difference data reaches the proper degree, the credibility degree of the present road data of the location corresponding to the difference data is reduced from the preceding evaluation result.

Figure 7:
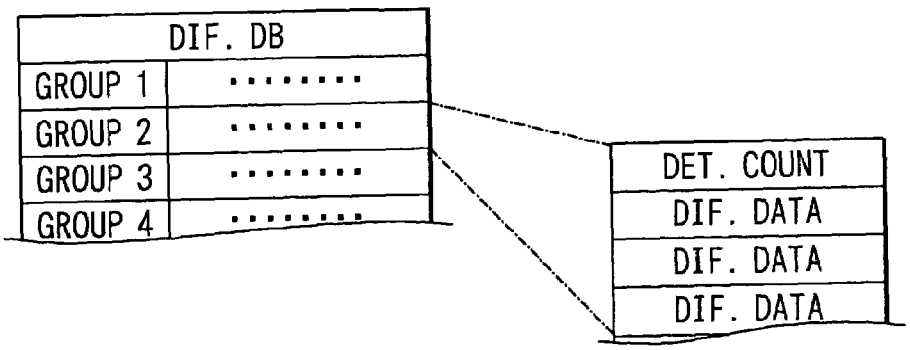
FIG. 7 is a diagram showing structure of difference database.

Structure of the difference database 47 is shown in FIG. 7. The difference database 47 includes, with respect to each of groups, a determining count (initial value is zero) and the difference data being correlated with the determining count. Here, the group indicates a region that is previously specified.

At Step 341, the CPU 41 stores in the difference database 47 the incremented result of the above determining count. At Step 342, the CPU 41 simultaneously registers in the difference database 47 the difference data with being correlated with the determining count.

Through the above-mentioned processing of the map evaluation device 40, the difference database 47 is stored, with respect to each group, with the determining count and difference data for which the determining count is incremented. In this embodiment, accordingly, through the processing of the CPU 41, a history of evaluation results regarding the credibility degree of the road data is stored as the determining count in the difference database 47.

At Step 343, the CPU 41 then determines whether the updated determining count is equal to a given value or more. When the count is determined to be less than the given value, the processing is terminated. Otherwise, when the count is determined to be equal to the given value or more (Yes at Step 343), the CPU 41 outputs a command of outputting the amended portion of the map to then terminate the map evaluating processing.

As the map evaluating processing is terminated, the CPU 41 determines at Step 350 in FIG. 5 whether the command of outputting is outputted. When the command is determined to be not outputted (No at Step 350), the main routine is terminated. When the command is determined to be outputted (Yes at Step 350), the CPU 41 displays (at Step 360) the amended portion of the map on the screen of the monitor 53 that is connected with the device 40 through the interfacing unit 51. The main routine is then terminated.

In detail, at Step 360, the corresponding road data is read out from the map database 49 and displayed on the screen of the monitor 53. Simultaneously, the vehicle path indicated by the difference data is displayed (with coloring or blinking) with being overlapped on the displayed road map for indicating the amended portion. Here, the corresponding road data is road data around the location indicated by the difference data that is included in the group of the outputting target. Thus, information of the location having a low credibility degree regarding the road data can be outputted on the monitor 53 for urging the user to update the road data.

In the map evaluation system 1 of this embodiment, difference data is generated when it is determined that a vehicle travels in a location where a road is assumed to be not present on road data through collating the road data with vehicle path data. The generated difference data is transmitted to the map evaluation device 40. The user of the system 1 comprehends a location where a new road is assumed to be constructed.

Furthermore, in this embodiment, an accuracy degree of difference data is determined by using an additional data, so that reliable information can be displayed on the monitor 53 regarding a location whose road data is assumed to need updating. Namely, the user can update the road data after investigating a real site of the corresponding location based on the contents outputted in the monitor 53.

As a result, according to the map evaluation system 1 of the embodiment, reliable road data properly indicating a real road configuration can be distributed to car navigation devices with a communication medium or a portable memory medium such as CD-ROM and DVD. This thereby enables the car navigation devices to execute proper routing assistance.

Furthermore, the updated road data can be distributed as printed material. This reduces problems resulting from that a driver travels based on a road map that is not updated to the latest version.

Furthermore, a location indicated by difference data is outputted on the monitor 53 only when it is determined, based on the determining count indicating a credibility degree of the road data, that the same contents of the difference data are repeatedly received from the car navigations. This restricts outputting of a message commanding an amended portion that does not need updating.

Furthermore, when a version of a map database 34 of the car navigation device 10 is not the latest, the difference database 47 is not updated and the determining count is not incremented. This restricts outputting on the monitor 53 a wrong amended portion due to receiving the difference data generated using the old version of the map database.

Furthermore, the determining count is not incremented based on the difference data generated when a detection accuracy of the position detecting unit 20 is not favorable. This restricts deteriorating of credibility of the information regarding an amended portion of the map.

The above embodiment can be modified as the following. For instance, in the embodiment, difference data received from the car navigation device 10 is accumulated in the difference database 47 of the map evaluation device 40. However, each time difference data is received from the car navigation device 10, integral difference data can be newly registered in the difference database 47. Namely, the difference data is integrated into the difference data previously registered in the difference database 47.

Furthermore, when difference data stored in the difference database 47 is displayed on the screen of the monitor 53, all the pieces of the difference data stored in the database 47 is displayed. However, the most accurate difference data can be estimated based on the plural pieces of the difference data, so that only the data estimated as the most accurate data can be displayed on the screen of the monitor 53.

Furthermore, difference data can be generated by determining that difference is present between a road location of the road map and a vehicle path when a vehicle hardly uses the road location even though the road location is indicated by the road map.

It will be obvious to those skilled in the art that various changes may be made in the above-described embodiments of the present invention. However, the scope of the present invention should be determined by the following claims.

What is claimed is:

1. A map evaluation system comprising:
   a map database storing a road map;
   map collating means for determining, by collating a road location with a vehicle position path, whether a difference is present between the vehicle position path and the road location and for then generating difference information indicating a location of the difference when the difference is determined to be present, wherein the vehicle position path is detected by a vehicle position detecting unit while the road location is indicated on the road map corresponding to the vehicle position path;
   difference accuracy information obtaining means for obtaining accuracy information used for determining degree of accuracy for the difference information, wherein the accuracy information includes at least generating-time information indicating a generating time when the vehicle position path is detected;
   difference accuracy determining means for executing determination of the degree of accuracy for the difference information based on the accuracy information;
   map evaluating means for executing evaluation of degree of credibility for a portion of the road map based on a result of determination of the degree of accuracy executed by the difference accuracy determining means, wherein the portion of the road map corresponds to the location of the difference; and outputting means for outputting a result of the evaluation of the degree of credibility executed by the map evaluating means.

2. The map evaluation system of claim 1, wherein the collating means determines, by collating the road location with the vehicle position path, whether the vehicle position path is present on the location where no road is indicated on the road map and generates the difference information indicating the location when the vehicle position path is determined to be present on the location where no road is indicated on the road map.

3. The map evaluation system of claim 1, wherein, when the map evaluating means executes the evaluation that the degree of credibility for the portion of the road map is equal to a given degree or below, the outputting means outputs, as the result of the evaluation, the difference information.

4. The map evaluation system of claim 1, further comprising:

evaluation result storing means for storing the result of the evaluation executed by the map evaluating means, wherein the map evaluating means executes the evaluation of the degree of credibility for the portion of the road map based on the result of the determination of the degree of accuracy executed by the difference accuracy determining means and a history of the result of the evaluation stored by the evaluation result storing means.

5. The map evaluation system of claim 4, wherein, when the difference accuracy determining means executes the determination that the degree of accuracy for the difference information is a proper degree, the map evaluating means lowers the degree of credibility for the portion of the road map from a degree of credibility for the portion of the road map included in a previous result of the evaluation that is stored by the evaluation result storing means.

6. The map evaluation system of claim 1, further comprising:

transmitting means for transmitting the difference information and the accuracy information to an outside device;

difference information determining means for determining whether the difference information generated by the map collating means is newly generated; and difference information storing means for storing difference information that is transmitted by the transmitting means, wherein the difference information determining means determines whether the generated difference information is newly generated by comparing it to information stored in the difference information storing means, and wherein if the difference information determining means determines that the difference information is not newly generated, the transmitting means does not transmit the difference information.

7. A collation device comprising:

map collating means for determining, by collating a road location with a vehicle position path, whether a difference is present between the vehicle position path and the road location and for then generating difference information indicating a location of the difference when the difference is determined to be present, wherein the vehicle position path is detected by a vehicle position detecting unit while the road location is indicated on a road map that is stored in a map database and corresponds to the vehicle position path;

difference accuracy information obtaining means for obtaining accuracy information used for determining degree of accuracy for the difference information, wherein the accuracy information includes at least generating-time information indicating a generating time when the vehicle position path is detected; and transmitting means for transmitting the difference information and the accuracy information to an outside device.

8. The collation device of claim 7, wherein the collating means determines, by collating the road location with the vehicle position path, whether the vehicle position path is present on the location where no road is indicated on the road map and generates the difference information indicating the location when the vehicle position path is determined to be present on the location where no road is indicated on the road map.

9. The collation device of claim 7, wherein the accuracy information obtaining means obtains the accuracy information that includes information relating to degree of accuracy of position detection of the vehicle position detecting unit.

10. The collation device of claim 7, wherein the map database is internally included, and wherein the accuracy information obtaining means obtains the accuracy information that includes version information indicating a version of the map database.

11. The collation device of claim 7, wherein the map database is internally included, and wherein the accuracy information obtaining means obtains the accuracy information that includes information relating to degree of accuracy of position detection of the vehicle position detecting unit and version information indicating a version of the map database.

12. The collation device of claim 7, further comprising:

difference information determining means for determining whether the difference information generated by the map collating means is newly generated; and difference information storing means for storing difference information that is transmitted by the transmitting means, wherein the difference information determining means determines whether the generated difference information is newly generated by comparing it to information stored in the difference information storing means, and wherein if the difference information determining means determines that the difference information is not newly generated, the transmitting means does not transmit the difference information.

13. A map evaluation device capable of being communicated with a collation device that includes:

map collating means for determining, by collating a road location with a vehicle position path, whether a difference is present between the vehicle position path and the road location and for then generating difference information indicating a location of the difference when the difference is determined to be present, wherein the vehicle position path is detected by a vehicle position detecting unit while the road location is indicated on a road map that is stored in a map database and corresponds to the vehicle position path;

difference accuracy information obtaining means for obtaining accuracy information used for determining a degree of accuracy for the difference information, wherein the accuracy information includes at least generating-time information indicating a generating time when the vehicle position path is detected; and transmitting means for transmitting the difference information and the accuracy information to an outside device, the map evaluation device comprising:

receiving means for receiving the difference information and the accuracy information transmitted by the collation device;

difference accuracy determining means for executing determination of the degree of accuracy for the difference information based on the accuracy information;

map evaluating means for executing evaluation of degree of credibility for a portion of the road map based on a result of determination of the degree of accuracy executed by the difference accuracy determining means, wherein the portion of the road map corresponds to the location of the difference indicated by the difference information; and outputting means for outputting a result of the evaluation of the degree of credibility executed by the map evaluating means.

14. The map evaluation device of claim 13, wherein, when the map evaluating means executes the evaluation that the degree of credibility for the portion of the road map is equal to a given degree or below, the outputting means outputs, as the result of the evaluation, the difference information.

15. The map evaluation device of claim 13, further comprising:

evaluation result storing means for storing the result of the evaluation executed by the map evaluating means, wherein the map evaluating means executes the evaluation of the degree of credibility for the portion of the road map based on the result of the determination of the degree of accuracy executed by the difference accuracy determining means and a history of the result of the evaluation stored by the evaluation result storing means.

16. The map evaluation device of claim 15, wherein, when the difference accuracy determining means executes the determination that the degree of accuracy for the difference information is a proper degree, the map evaluating means lowers the degree of credibility for the portion of the road map from a degree of credibility for the portion of the road map included in a previous result of the evaluation that is stored by the evaluation result storing means.

17. The map evaluation device of claim 13, wherein the collation device further includes:

difference information determining means for determining whether the difference information generated by the map collating means is newly generated; and difference information storing means for storing difference information that is transmitted by the transmitting means, wherein the difference information determining means determines whether the generated difference information is newly generated by comparing it to information stored in the difference information storing means, and wherein if the difference information determining means determines that the difference information in not newly generated, the transmitting means does not transmit the difference information.

18. A map evaluation device capable of being communicated with a collation device that includes:

map collating means for determining, by collating a road location with a vehicle position path, whether a difference is present between the vehicle position path and the road location and for then generating difference information indicating a location of the difference when the difference is determined to be present, wherein the vehicle position path is detected by a vehicle position detecting unit while the road location is indicated on a road map that is stored in a map database and corresponds to the vehicle position path;

difference accuracy information obtaining means for obtaining accuracy information used for determining degree of accuracy for the difference information; wherein the accuracy information includes at least generating-time information indicating a generating time when the vehicle position path is detected; and transmitting means for transmitting the difference information and the accuracy information to an outside device, wherein the accuracy information obtaining means obtains the accuracy information that includes information relating to degree of accuracy of position detection of the vehicle position detecting unit, the map evaluation device comprising:

receiving means for receiving the difference information and the accuracy information transmitted by the collation device;

difference accuracy determining means for executing determination of the degree of accuracy for the difference information based on the accuracy information;

map evaluating means for executing evaluation of degree of credibility for a portion of the road map based on a result of determination of the degree of accuracy executed by the difference accuracy determining means, wherein the portion of the road map corresponds to the location of the difference indicated by the difference information;

outputting means for outputting a result of the evaluation of the degree of credibility executed by the map evaluating means; and evaluation result storing means for storing the result of the evaluation executed by the map evaluating means, wherein the map evaluating means executes the evaluation of the degree of credibility for the portion of the road map based on the result of the determination of the degree of accuracy executed by the difference accuracy determining means and a history of the result of the evaluation stored by the evaluation result storing means, wherein, when the difference accuracy determining means executes the determination that the degree of accuracy for the difference information is a proper degree, the map evaluating means lowers the degree of credibility for the portion of the road map from a degree of credibility for the portion of the road map included in a previous result of the evaluation that is stored by the evaluation result storing means, wherein the difference accuracy determining means determines whether the degree of position detection of the position detecting unit is equal to a given degree or above based on the accuracy information, and wherein, when the degree of position detection is determined to be the given degree or above, the difference accuracy determining means determines that the degree of accuracy for the difference information is the proper degree.

19. A map evaluation device of claim 18,
wherein the collation device further includes:
difference information determining means for determining whether the difference information generated by the map collating means is newly generated; and
difference information storing means for storing difference information that is transmitted by the transmitting means,
wherein the difference information determining means determines whether the generated difference information is newly generated by comparing it to information stored in the difference information storing means, and
wherein if the difference information determining means determines that the difference information is not newly generated, the transmitting means does not transmit the difference information.

20. A map evaluation device capable of being communicated with a collation device that includes:
map collating means for determining, by collating a road location with a vehicle position path, whether a difference is present between the vehicle position path and the road location and for then generating difference information indicating a location of the difference when the difference is determined to be present, wherein the vehicle position path is detected by a vehicle position detecting unit while the road location is indicated on a road map that is stored in a map database and corresponds to the vehicle position path;
difference accuracy information obtaining means for obtaining accuracy information used for determining degree of accuracy for the difference information; and
transmitting means for transmitting the difference information and the accuracy information to an outside device,
wherein the map database is internally included in the collation device, and
wherein the accuracy information obtaining means obtains the accuracy information that includes version information indicating a version of the map database,
the map evaluation device comprising:
receiving means for receiving the difference information and the accuracy information transmitted by the collation device;
difference accuracy determining means for executing determination of the degree of accuracy for the difference information based on the accuracy information;
map evaluating means for executing evaluation of degree of credibility for a portion of the road map based on a result of determination of the degree of accuracy executed by the difference accuracy determining means, wherein the portion of the road map corresponds to the location of the difference indicated by the difference information;
outputting means for outputting a result of the evaluation of the degree of credibility executed by the map evaluating means; and
evaluation result storing means for storing the result of the evaluation executed by the map evaluating means,
wherein the map evaluating means executes the evaluation of the degree of credibility for the portion of the road map based on the result of the determination of the degree of accuracy executed by the difference accuracy determining means and a history of the result of the evaluation stored by the evaluation result storing means,
wherein, when the difference accuracy determining means executes the determination that the degree of accuracy for the difference information is a proper degree, the map evaluating means lowers the degree of credibility for the portion of the road map from a degree of credibility for the portion of the road map included in a previous result of the evaluation that is stored by the evaluation result storing means,
wherein the difference accuracy determining means determines whether the version of the map database is latest based on the accuracy information,
wherein, when the version of the map database is determined to be latest, the difference accuracy determining means determines that the degree of accuracy for the difference information is the proper degree and then causes a command to be output fo updating the map database based on the difference information.

21. A map evaluation device capable of being communicated with a collation device that includes:
map collating means for determining, by collating a road location with a vehicle position path, whether a difference is present between the vehicle position path and the road location and for then generating difference information indicating a location of the difference when the difference is determined to be present, wherein the vehicle position path is detected by a vehicle position detecting unit while the road location is indicated on a road map that is stored in a map database and corresponds to the vehicle position path;
difference accuracy information obtaining means for obtaining accuracy information used for determining degree of accuracy for the difference information; and
transmitting means for transmitting the difference information and the accuracy information to an outside device,
wherein the map database is internally included in the collation device, and
wherein the accuracy information obtaining means obtains the accuracy information that includes version information indicating a version of the map database and information relating to a degree of accuracy of position detection of the vehicle position detecting unit,
the map evaluation device comprising:
receiving means for receiving the difference information and the accuracy information transmitted by the collation device;
difference accuracy determining means for executing determination of the degree of accuracy for the difference information based on the accuracy information;
map evaluating means for executing evaluation of degree of credibility for a portion of the road map based on a result of determination of the degree of accuracy executed by the difference accuracy determining means, wherein the portion of the road map corresponds to the location of the difference indicated by the difference information;
outputting means for outputting a result of the evaluation of the degree of credibility executed by the map evaluating means; and
evaluation result storing means for storing the result of the evaluation executed by the map evaluating means, wherein the map evaluating means executes the evaluation of the degree of credibility for the portion of the road map based on the result of the determination of the degree of accuracy executed by the difference accuracy determining means and a history of the result of the evaluation stored by the evaluation result storing means, wherein, when the difference accuracy determining means executes the determination that the degree of the accuracy for the difference information is a proper degree, the map evaluating means lowers the degree of credibility for the portion of the road map from a degree of credibility for the portion of the road map included in a previous result of the evaluation that is stored by the evaluation result storing means, wherein the difference accuracy determining means determines whether the version of the map database is latest and whether the degree of position detection of the position detecting unit is equal to a given degree or above based on the accuracy information, and wherein, when the version of the map database is determined to be latest and the degree of position detection is determined to be the given degree or above, the difference accuracy determining means determines that the degree of accuracy for the difference information is the proper degree and then causes a command to be output for updating the map database based on the difference information, and wherein, when the version of the map database is determined to be not latest or the degree position detection is determined to be not the given degree or above, the difference accuracy determining means determines that the degree of accuracy for the difference information is not the proper degree and causes no command to be output for updating the map database based on the difference information.

* * * * *